US012291136B2

(12) United States Patent
Escobar et al.

(10) Patent No.: US 12,291,136 B2
(45) Date of Patent: May 6, 2025

(54) HANDS-FREE RELEASE SYSTEM FOR A PASSENGER SEAT

(71) Applicant: Safran Seats USA LLC, Gainesville, TX (US)

(72) Inventors: Kristyan Khalil Escobar, Chihuahua (MX); Nicolas Chauland, Plaisir (FR); Mark Anil Mathew, Issoudun (FR)

(73) Assignee: Safran Seats USA LLC, Gainesville, TX (US)

( * ) Notice: Subject to any disclaimer, the term of this patent is extended or adjusted under 35 U.S.C. 154(b) by 202 days.

(21) Appl. No.: 17/925,655

(22) PCT Filed: Aug. 11, 2020

(86) PCT No.: PCT/US2020/045743
§ 371 (c)(1),
(2) Date: Nov. 16, 2022

(87) PCT Pub. No.: WO2021/236137
PCT Pub. Date: Nov. 25, 2021

(65) Prior Publication Data
US 2023/0219477 A1 Jul. 13, 2023

Related U.S. Application Data

(60) Provisional application No. 63/026,598, filed on May 18, 2020.

(51) Int. Cl.
*B60N 2/90* (2018.01)
*B60N 3/00* (2006.01)

(52) U.S. Cl.
CPC ............. *B60N 2/919* (2018.02); *B60N 3/002* (2013.01)

(58) Field of Classification Search
CPC .......... B60N 2/919; B60N 3/002; A47C 7/68; A47C 7/70
(Continued)

(56) References Cited

U.S. PATENT DOCUMENTS 2,894,566 A 7/1959 Herider et al.
3,467,425 A * 9/1969 Ferrara .................. B60N 3/004
297/146

(Continued)

FOREIGN PATENT DOCUMENTS

CN 108909571 A * 11/2018 ............. B60N 3/004
DE 3723027 C1 9/1988
(Continued)

OTHER PUBLICATIONS

International Patent Application No. PCT/US2020/045743, International Search Report and Written Opinion, dated Feb. 8, 2021.
(Continued)

*Primary Examiner* — Jose V Chen
(74) *Attorney, Agent, or Firm* — Kilpatrick Townsend & Stockton LLP

(57) ABSTRACT

Described is a passenger seat having a seat member moveable between a stowed position and a deployed position and at least one actuator coupled to at least one portion of the seat member, wherein the at least one actuator is activable without direct contact with a passenger's hand to change a lock state of the seat member, and wherein an unlocked state of the seat member permits movement of the seat member between the stowed position and the deployed position.

20 Claims, 6 Drawing Sheets

(58) Field of Classification Search
USPC .................................... 297/463.1, 146, 163
See application file for complete search history.

(56) References Cited

U.S. PATENT DOCUMENTS

| | | | | |
|---|---|---|---|---|
| 4,913,494 | A | 4/1990 | Ikegaya | |
| 5,931,527 | A * | 8/1999 | D'Onofrio | B60N 3/004 297/188.05 |
| 6,601,523 | B2 * | 8/2003 | Jensen | B64D 11/0638 297/146 |
| 6,761,398 | B2 * | 7/2004 | Bentley | B61D 33/0007 297/165 |
| 7,287,817 | B2 * | 10/2007 | Goldman | B64D 11/0638 297/146 |
| 7,469,966 | B1 * | 12/2008 | Vallee | A47C 1/121 297/331 |
| 7,770,966 | B2 * | 8/2010 | Johnson | B64D 11/0693 297/122 |
| 8,096,612 | B2 * | 1/2012 | Schumm | B64D 11/0646 297/125 |
| 10,384,581 | B2 * | 8/2019 | Preisler | B60R 11/0252 |
| 2003/0094840 | A1 * | 5/2003 | Williamson | B60N 3/002 297/248 |
| 2007/0052263 | A1 * | 3/2007 | Baumann | B64D 11/06 297/146 |
| 2010/0253516 | A1 | 10/2010 | Lemerand et al. | |
| 2011/0156452 | A1 | 6/2011 | Schumm et al. | |
| 2011/0259213 | A1 | 10/2011 | Azizi | |
| 2014/0196372 | A1 | 7/2014 | Boren et al. | |
| 2017/0136921 | A1 * | 5/2017 | Dill | B60N 2/206 |
| 2019/0033978 | A1 | 1/2019 | Eijkelenboom | |
| 2020/0214448 | A1 * | 7/2020 | Jacobs | A47C 7/723 |
| 2022/0087435 | A1 * | 3/2022 | Smit | A47C 15/004 |
| 2023/0414003 | A1 * | 12/2023 | Hough | A47C 1/03255 |

FOREIGN PATENT DOCUMENTS

| | | | |
|---|---|---|---|
| DE | 102014105565 A1 | 10/2015 | |
| DE | 102018113132 A1 | 12/2019 | |
| EP | 2933184 A1 | 10/2015 | |
| EP | 3299293 A1 | 3/2018 | |
| EP | 3372503 A1 | 9/2018 | |
| GB | 2513160 A | 10/2014 | |
| KR | 20120038073 A | 4/2012 | |
| KR | 20230166436 A * | 12/2023 | |
| WO | WO-2006130975 A1 * | 12/2006 | B60N 2/3011 |
| WO | 2021236138 A1 | 11/2021 | |

OTHER PUBLICATIONS

European Application No. 20761081.7, Office Action mailed on Oct. 4, 2024, 4 pages.

* cited by examiner

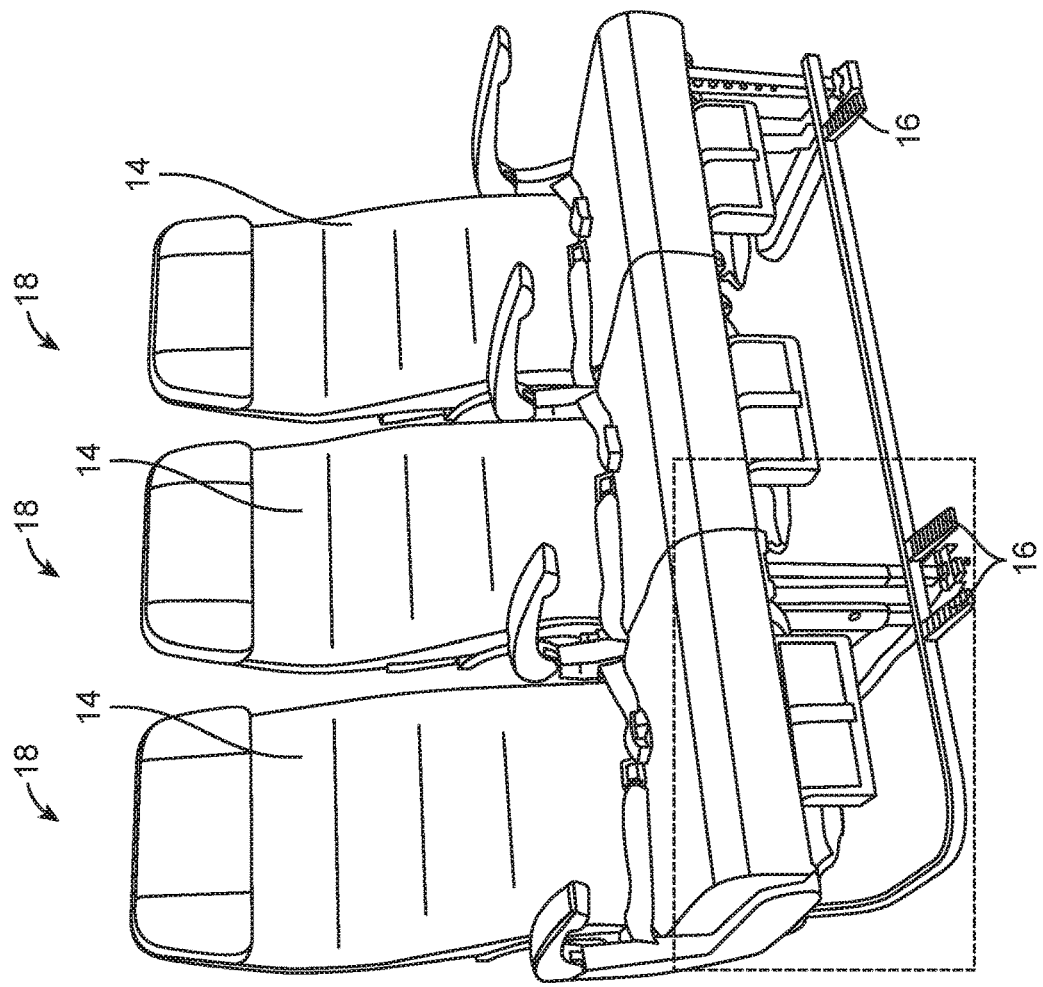
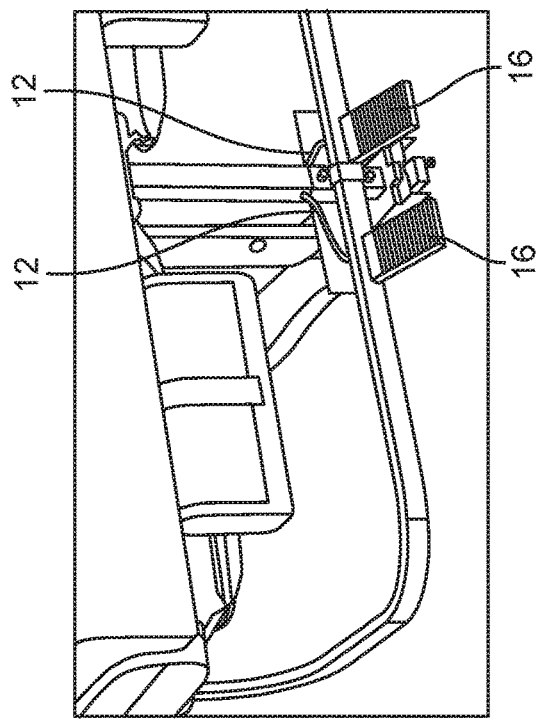
FIG. 4A
FIG. 4B

HANDS-FREE RELEASE SYSTEM FOR A PASSENGER SEAT

CROSS REFERENCE TO RELATED APPLICATIONS

This patent application is related to and claims priority benefits from U.S. Provisional Application Ser. No. 63/026,598, filed on May 18, 2020, entitled "FOOT PEDAL FOR BACKREST AND TABLE DEPLOYMENT ON AN AIRCRAFT PASSENGER SEAT" ("the '598 application"). The '598 application is hereby incorporated in its entirety by this reference.

This patent application incorporates by reference the disclosure of one co-pending PCT patent application. This co-pending PCT patent application is "HANDS-FREE ASSEMBLY FOR A PASSENGER VEHICLE," filed by Nguyen Tien Foek Le, PCT Application Serial No. PCT/US2020/045798, filed on Aug. 11, 2020. The disclosure of this application is hereby incorporated herein in its entirety by this reference.

FIELD OF THE INVENTION

The field of the invention relates to passenger seats, and, more particularly, to hands-free release systems for a passenger seat.

BACKGROUND

Passenger vehicles, such as aircraft, buses, trains, ships, and automobiles, include passenger seats for passengers to sit in and utilize during travel. Over the course of a day, or even several hours, multiple different passengers may sit in the same passenger seat. Each passenger sitting in the same passenger seat has the potential to contaminate various areas of that passenger seat with germs or pathogens. Subsequent passengers sitting in the same seat then run the risk of contaminating themselves through contact with various areas, including high-contact areas, of the contaminated passenger seat. The emergence of the Coronavirus has led to an increased desire among passengers to inhibit the propagation of pathogens by reducing the number of hand-contact touch points present on the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises a seat member moveable between a stowed position and a deployed position; and at least one actuator coupled to at least one portion of the seat member, wherein the at least one actuator is activable without direct contact with a passenger's hand to change a lock state of the seat member, and wherein an unlocked state of the seat member permits movement of the seat member between the stowed position and the deployed position.

In some embodiments, the seat member comprises at least one of a tray table, a seat back, or a personal electronic device holder.

In certain embodiments, the passenger seat further comprises a pedal coupled to the at least one actuator, wherein the pedal is pressable without direct contact with the passenger's hand to activate the at least one actuator to change the lock state of the seat member.

The at least one actuator may comprise at least one cable coupled between the pedal and the at least one portion of the seat member.

A movement of the pedal, in some embodiments, controls a movement of the seat member.

The at least one portion of the seat member, in certain embodiments, comprises a lock that maintains the stowed position of the seat member in a locked state.

The lock may be coupled to the at least one actuator, may be engaged with the seat member in the locked state, and may be disengaged from the seat member in the unlocked state.

According to certain embodiments of the present invention, a hands-free release system comprises at least one actuator coupled to at least one portion of a seat member of a passenger seat; and a mechanism coupled to the at least one actuator, wherein the mechanism is engageable without direct contact with a passenger's hand to change a lock state of the seat member, and wherein an unlocked state of the seat member permits movement of the seat member between a stowed position and a deployed position.

In some embodiments, the seat member comprises at least one of a tray table, a seat back, or a personal electronic device holder.

In certain embodiments, the mechanism comprises a pedal that is pressable without direct contact with the passenger's hand.

A movement of the pedal may control a movement of the seat member.

The at least one actuator, in some embodiments, comprises at least one cable coupled between the mechanism and the at least one portion of the seat member.

The at least one portion of the seat member, in certain embodiments, comprises a lock that maintains the stowed position of the seat member in a locked state.

The lock may be coupled to the at least one actuator, may be engaged with the seat member in the locked state, and may be disengaged from the seat member in the unlocked state.

According to certain embodiments of the present invention, a method comprises engaging a mechanism of a passenger seat without direct contact with a passenger's hand to change a lock state of a seat member of the passenger seat; wherein the passenger seat comprises at least one actuator coupled to at least one portion of the seat member and the mechanism; wherein the mechanism is coupled to the at least one actuator; and wherein an unlocked state of the seat member permits movement of the seat member between a stowed position and a deployed position.

In some embodiments, the seat member comprises at least one of a tray table, a seat back, or a personal electronic device holder.

In certain embodiments, the at least one portion of the seat member comprises a lock that maintains the stowed position of the seat member in a locked state.

Engaging the mechanism may activate the at least one actuator and may cause the lock to disengage from the seat member.

The method, in some embodiments, further comprises moving the mechanism to control a movement of the seat member.

The method, in certain embodiments, further comprising engaging the mechanism a second time to activate the at least one actuator and cause the seat member to move from the deployed position to the stowed position.

BRIEF DESCRIPTION OF THE DRAWINGS

FIG. 4A is a front perspective view of a row of passenger seats each with another hands-free release system.

FIG. 4B is a detailed view of the dotted rectangle shown on the row of passenger seats of FIG. 4A.

DETAILED DESCRIPTION

Figure 1:
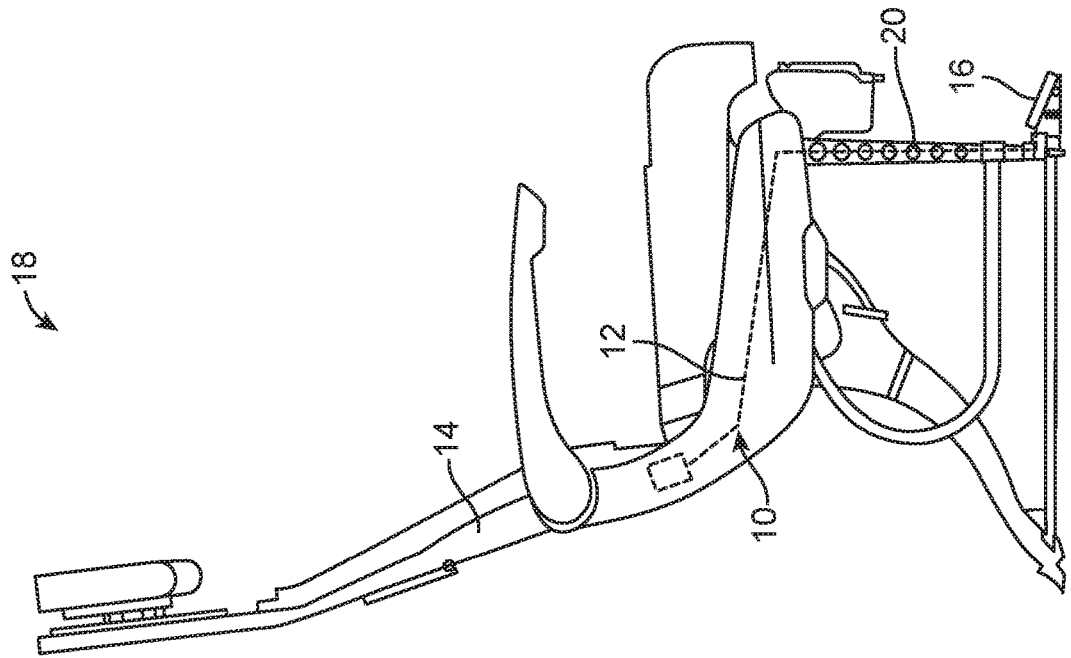
FIG. 1 is a left side view of a passenger seat with a hands-free release system, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a hands-free release system. In some embodiments, the hands-free release system is incorporated into a passenger seat. The hands-free release system may form at least a part of a hands-free aircraft assembly for aircraft seats. While the hands-free release system is discussed for use with aircraft seats, it is by no means so limited. Rather, embodiments of the hands-free release system may be used in passenger seats or other seats of any type or otherwise as desired.

Incorporating hands-free release systems into passenger seats may improve a passenger's interaction with the passenger seat. For example, a hands-free release system that controls the deployment of a tray table or a seat back may be utilized by a passenger whose hands are occupied. So a passenger may be holding various bags, personal items, or food or beverage items and still have the ability to deploy the tray table or adjust the position of the seat back.

Additionally, utilizing hands-free release systems in passenger seats may reduce the amount of contact the passenger may have with high contact areas of the passenger seat, such as a tray table latch or a seat recline button. Reducing the amount of contact between the passenger and the passenger seat may reduce the spread of viruses and pathogens between passengers as well as increase a passenger's sense of safety and confidence in travelling.

According to certain embodiments of the present invention, as shown in FIGS. 1-6D, a hands-free release system 10 incorporated into a passenger seat 18 includes at least one actuator 12. The hands-free release system 10 may also include at least one seat member 14 and at least one mechanism 16. In some embodiments, the hands-free release system 10 may be incorporated into other components of an aircraft, e.g., a door of an overhead bin, a door of a lavatory, a door of a passenger seat compartment, etc.

The hands-free release system 10, and any features of the hands-free release system 10, may be formed of materials including but not limited to aluminum, stainless steel, aramid fibers, polycarbonate, polypropylene, other metallic materials, composite materials, or other similar materials. Additionally, the seat member 14 may include or be at least partially covered by a cushioning material, such as foam, feathers, cotton, etc.

The seat member 14 is a moveable component of the passenger seat 18 or a row of passenger seats 18. For example, the seat member 14 may be at least one of a tray table, a seat back, a personal electronic device ("PED") holder, or any other suitable moveable component of the passenger seat 18. In some embodiments, the seat member 14 is moveable between a stowed position and a deployed position based on a lock state of the seat member 14. The seat member 14 may be in a locked state or an unlocked state. The locked state of the seat member 14 prevents movement between the stowed position and the deployed position while the unlocked state of the seat member 14 permits movement between the stowed position and the deployed position.

Figure 2:
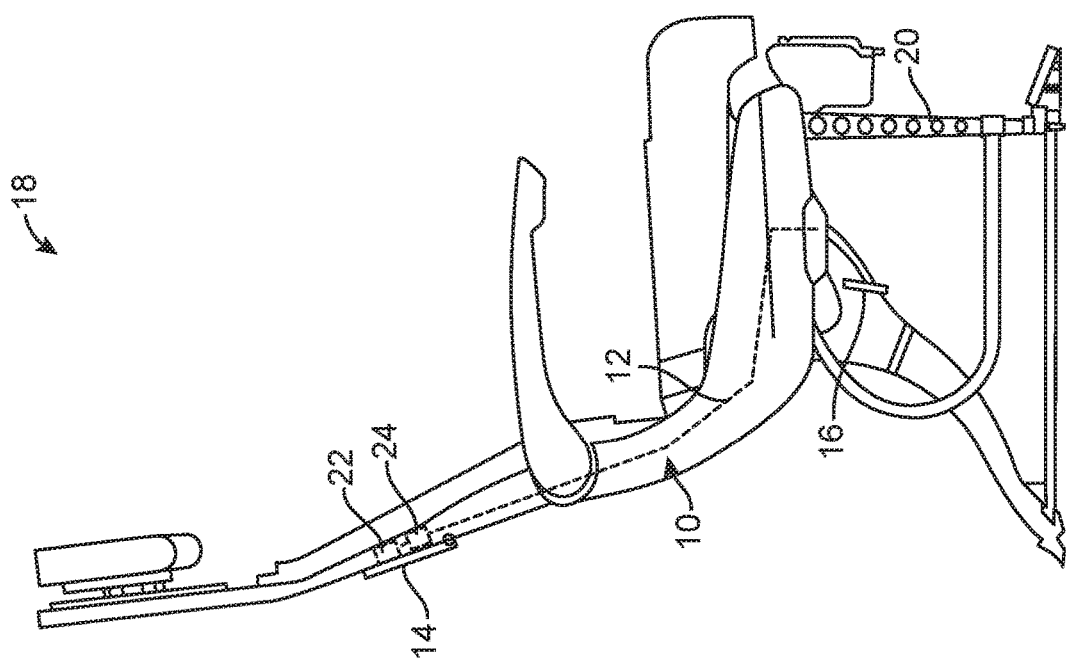
FIG. 2 is a left side view of a passenger seat with another hands-free release system, according to certain embodiments of the present invention.
Figure 3A:
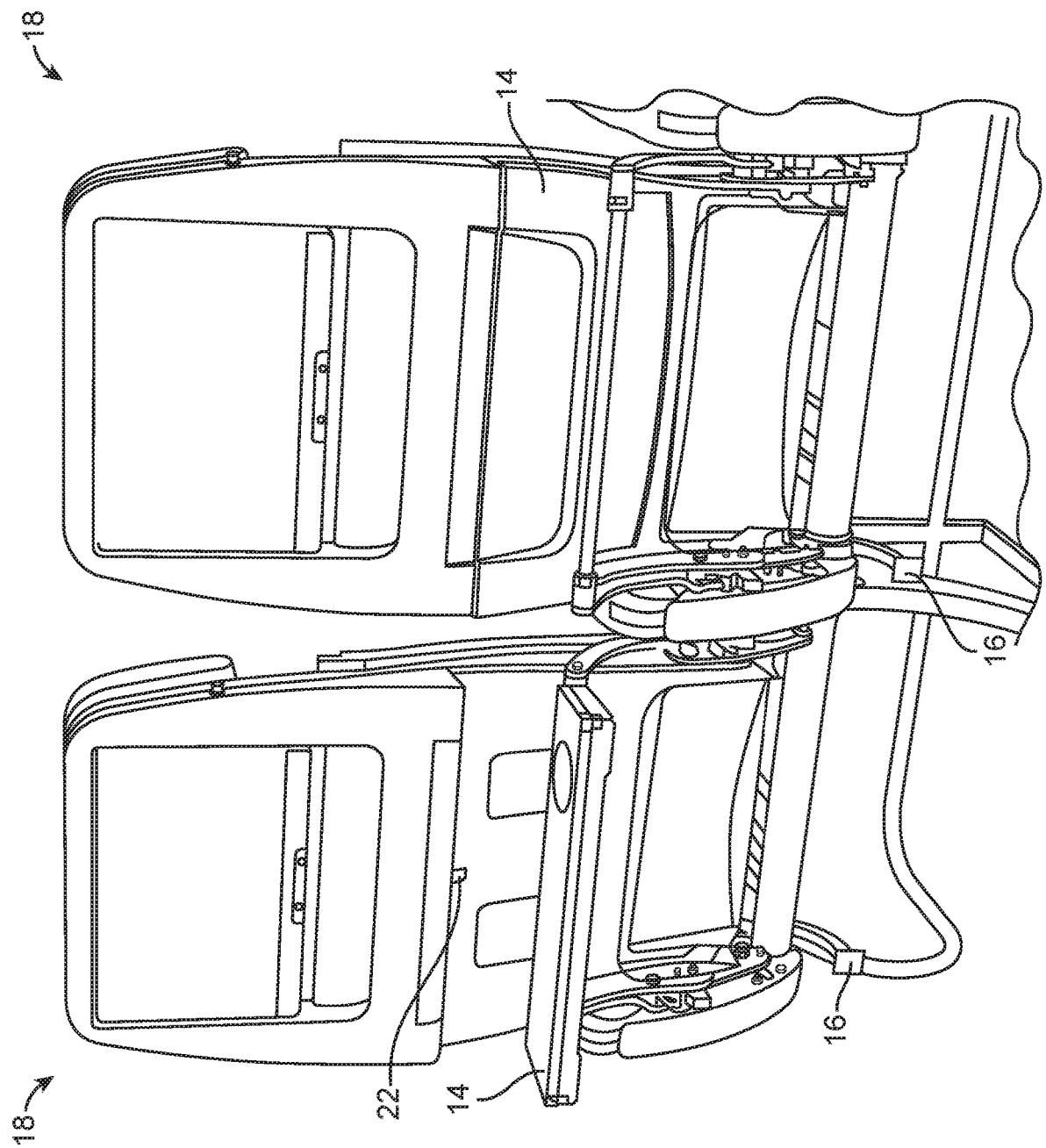
FIG. 3A is a rear perspective view of a row of passenger seats each with another hands-free release system.
Figure 3C:
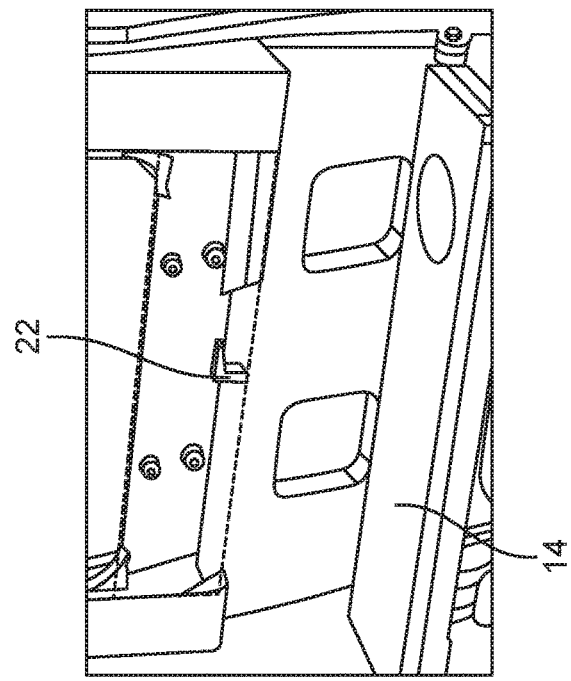
FIG. 3C is a detailed view of the dotted rectangle shown on the row of passenger seats of FIG. 3B.
Figure 3B:
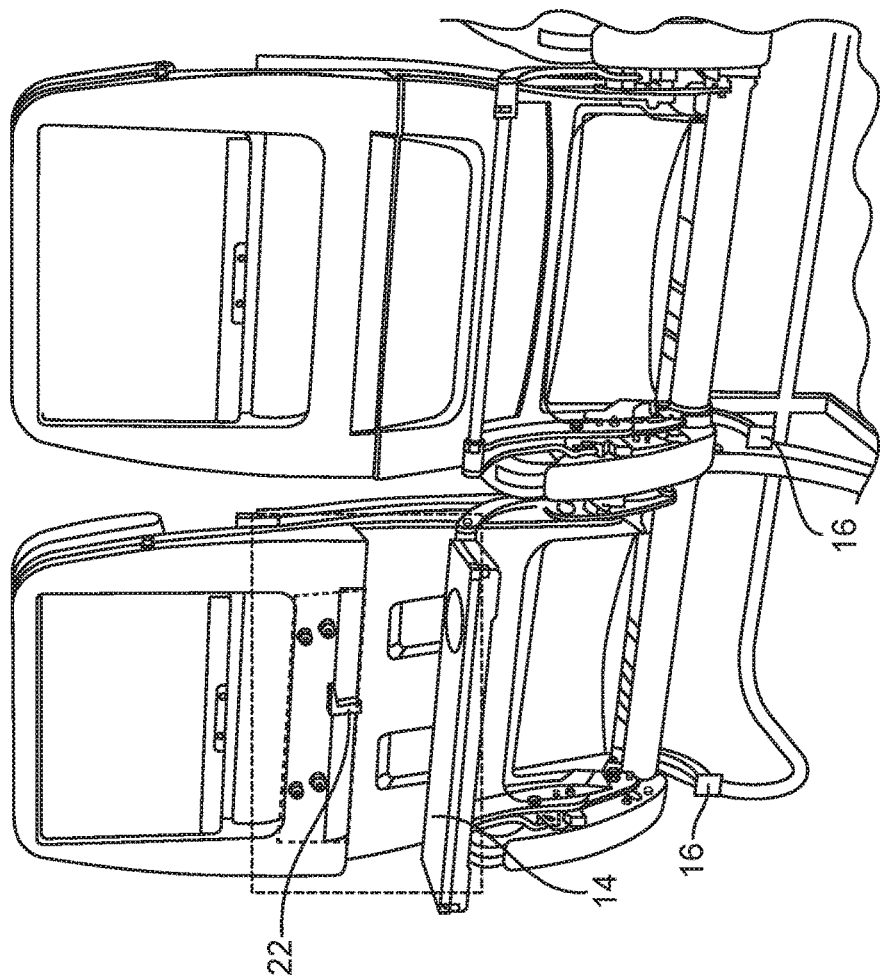
FIG. 3B is a rear perspective view of the row of passenger seats of FIG. 3A with a portion of the seat shroud removed.

As best shown in FIGS. 1-2, the at least one actuator 12 may extend at least partially through an interior portion of the passenger seat 18 and/or a seat frame 20. In some embodiments, the at least one actuator 12 may include at least one of a motor, a gear, a linear actuator, a cable, a piston, a belt, a pulley, a cam, a lever, a torsion spring, or any other suitable device. The at least one actuator 12 may be engaged with or coupled to at least one portion of the seat member 14. As is discussed in further detail below in reference to FIGS. 5A-6D, activation of the at least one actuator 12 may cause at least one of the lock state or the position of the seat member 14 to change.

In some embodiments, the at least one actuator 12 may also be coupled to the at least one mechanism 16. The at least one mechanism 16 may be physically or communicatively coupled to the at least one actuator 12. And a person of skill in the art would understand that the at least one mechanism 16 may be part of and/or integrally formed with the at least one actuator 12.

In some embodiments, the at least one mechanism 16 may be positioned at any suitable location on or proximate to the passenger seat 18, e.g., under the seat bottom, coupled to the seat frame 20, etc. The at least one mechanism 16 may be arranged to receive a hands-free input from a passenger and may be engageable without direct contact with a passenger's hand. For example, the at least one mechanism 16 may be a pedal that is pressable using a passenger's foot, shin, knee, elbow, etc. Additionally, the mechanism 16 may be a sensor, a button, a lever, an audio input device, or any other suitable device that is engageable without direct contact with a passenger's hand. As discussed below with respect to FIGS. 5A-6D, engaging the at least one mechanism 16 may cause the lock state of the seat member 14 to change.

The hands-free release system 10 may also include a lock 22 coupled to the seat member 14. In some embodiments, the actuator 12 is coupled to the lock 22. The lock 22 may determine the lock state of the seat member 14. For example, when the lock 22 is engaged with the seat member 14, the seat member 14 is in the locked state. Thus the engaged lock 22 may prevent movement of the seat member 14 and maintain the stowed position of the seat member 14. When the lock 22 is disengaged from the seat member 14, the seat member 14 is in the unlocked state and movement of the seat member 14 may be possible. The lock 22 may be a latch that engages with and secures the seat member 14, e.g., the tray table, to a seat back of the passenger seat 18 and maintains the stowed position of the tray table.

In some embodiments, a connector 24 may be used to couple either the actuator 12 to the seat member 14 or the actuator 12 to the lock 22. The connector 24 may be a spring, an elastic band, or any other suitable device.

Figure 5A:
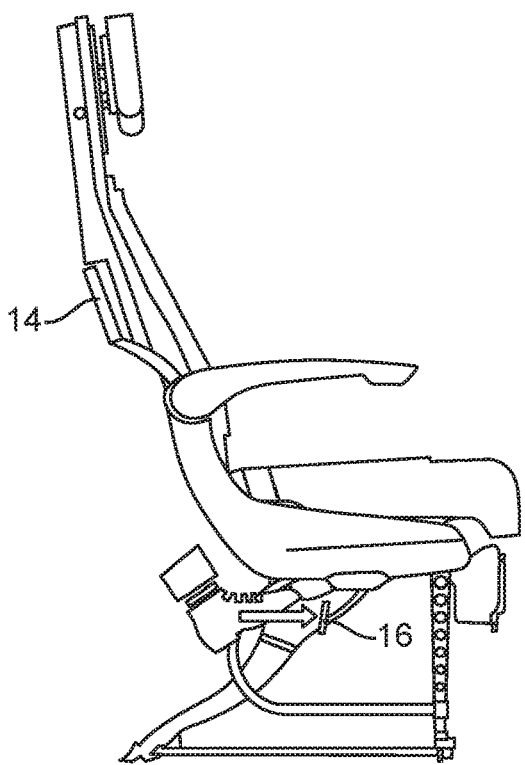
FIGS. 5A-5C are left side views of a passenger seat with a hands-free release system being activated, according to certain embodiments of the present invention.

As best illustrated in FIGS. 5A-6D, at least one of the lock state or the position of the seat member 14 may be changed without direct contact with a passenger's hand. In some embodiments, changing at least one of the lock state or the position of the seat member 14 is caused by engaging the mechanism 16, where the engagement occurs without direct contact with a passenger's hand. For example, a passenger's foot may press the mechanism 16, e.g., the pedal, as is best illustrated in FIGS. 5A and 6A. This hands-free input received by the mechanism 16 from the passenger engages the mechanism 16. While engagement using a passenger's foot is discussed, a person of skill in the art would understand that the passenger may use various other body parts, e.g., the shin, knee, elbow, shoulder, etc., or various personal items, e.g., a pen, a stylus, a cane, etc., to engage the mechanism 16 without direct contact with a passenger's hand.

In some embodiments, engaging the mechanism 16 will activate the at least one actuator 12. Activating the at least one actuator 12 may include adjusting the tension of the actuator 12 where the actuator 12 is a cable, powering the actuator 12 where the actuator 12 is a motor, rotating the actuator 12 where the actuator 12 is at least one gear, etc.

Activating the at least one actuator 12 will cause at least one of the lock state or the position of the seat member 14 to change. For example, the actuator 12 may be a cable coupled between the mechanism 16, e.g., the foot pedal, and the seat member 14, e.g., the seat back. Activating the cable, e.g., adjusting the tension of the cable, by pressing the foot pedal changes the lock state of the seat back from the locked state to the unlocked state and enables the position of the seat back to be adjusted between the stowed position and the deployed position.

In some embodiments, releasing the foot pedal reverses the adjustment of the tension of the cable thus changing the lock state of the seat back from the unlocked state to the locked state to maintain the adjusted position of the seat back. In further embodiments, releasing the foot pedal does not change the tension of the cable. Instead, the foot pedal may be pressed a second time to reverse the adjustment of the tension of the cable to change the seat back to be in the locked state. The foot pedal may be configured to return to its original position after the foot pedal is pressed a first time or the foot pedal may remain in the pressed position until the second time the foot pedal is pressed.

In some embodiments, the lock 22 will disengage from the seat member 14 based on the activation of the at least one actuator 12, which will change the lock state of the seat member 14 from the locked state to the unlocked state. The actuator 12 may disengage the lock 22 from the seat member 14 by causing the lock 22 to move in a substantially linear direction or by causing the lock 22 to rotate. The disengagement of the lock 22 enables the position of the seat member 14 to be adjusted.

Figure 5B:
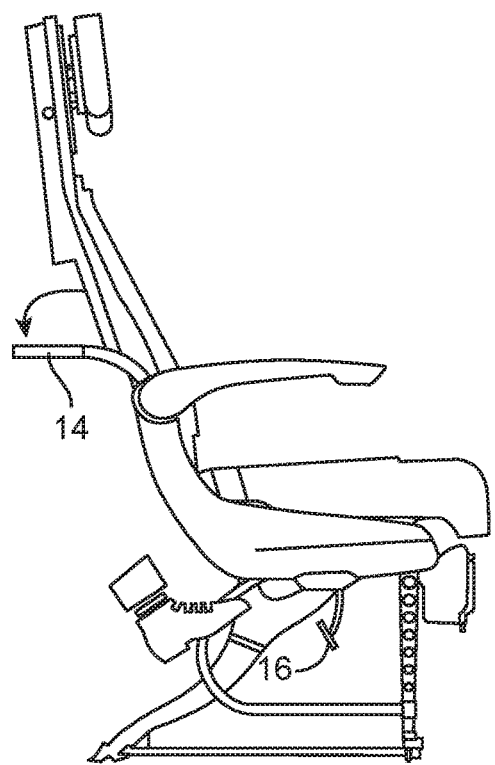
Figure 5C:
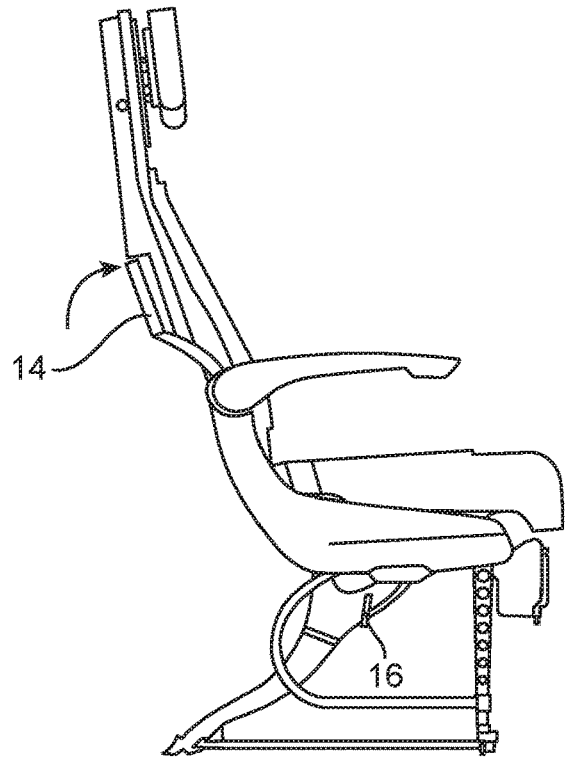

For example, the actuator 12 may be a cable coupled between the mechanism 16, e.g., the foot pedal, and the lock 22, e.g., the latch. Activating the cable, e.g., adjusting the tension of the cable, by pressing the foot pedal, as best illustrated in FIG. 5A, disengages the latch from the tray table thus changing the lock state of the seat back from the locked state to the unlocked state. Once the latch is disengaged from the tray table, the position of the tray table may be adjusted between the stowed position and the deployed position, as best illustrated in FIGS. 5B-5C. For example, the tray table may move to the deployed position after the latch is disengaged from the tray table due to gravitational forces or due to manipulation of the tray table itself by the passenger. Additionally, the tray table may be returned to the stowed position after deployment due to further manipulation of the tray table itself by the passenger.

Figure 6A:
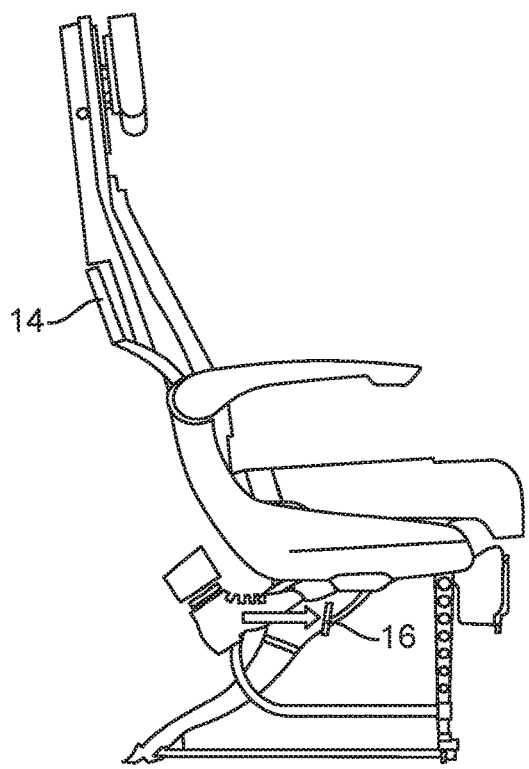
FIGS. 6A-6D are left side views of a passenger seat with another hands-free release system being activated, according to certain embodiments of the present invention.
Figure 6B:
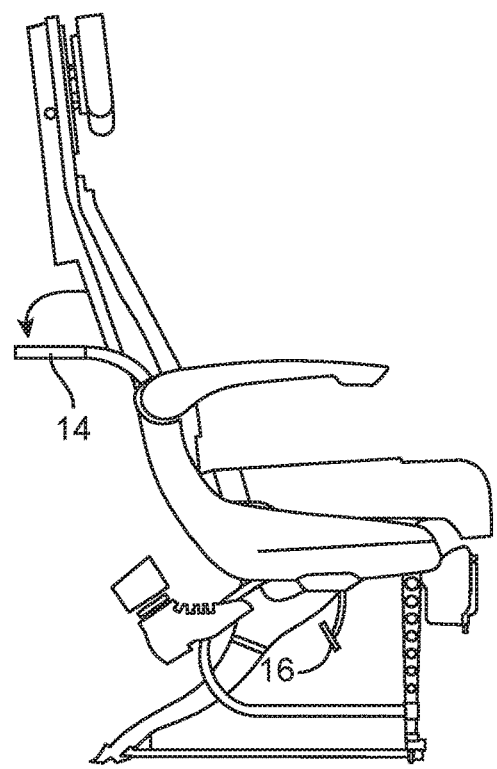
Figure 6C:
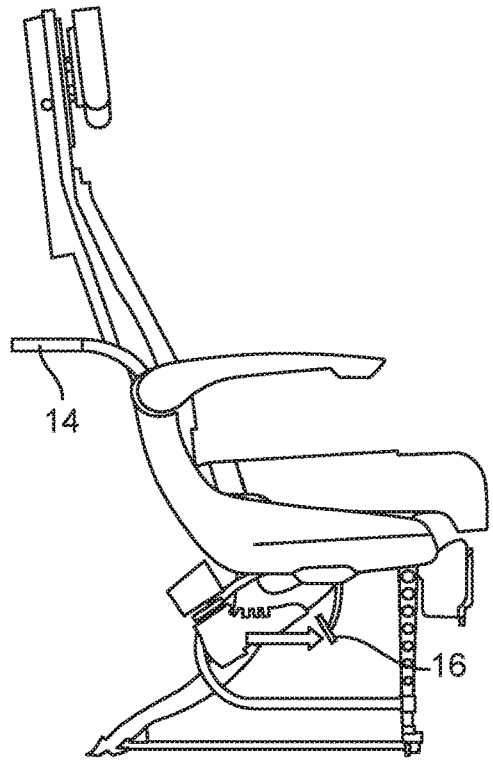
Figure 6D:
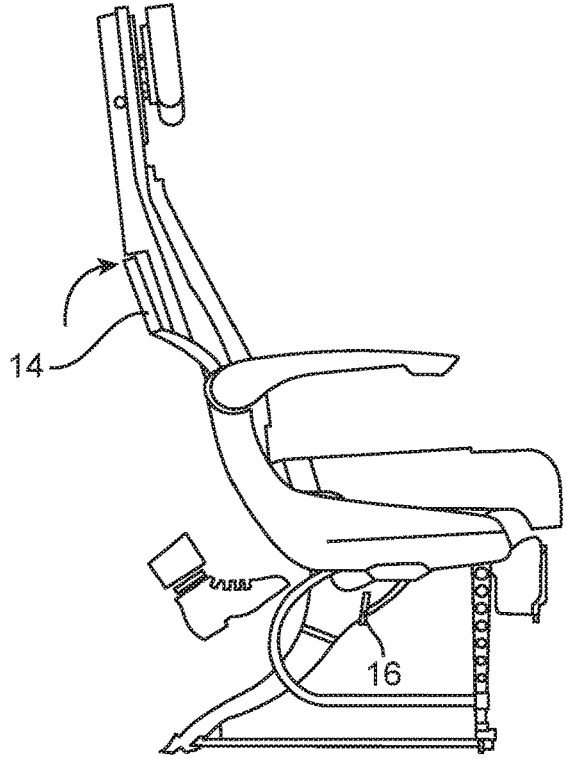

In further embodiments, the actuator 12 may be coupled with the seat member 14 so that the movement of the mechanism 16 caused by the engagement of the mechanism 16 will cause the seat member 14 to change positions. For example, the actuator 12 may be a cable coupled between the mechanism 16, e.g., the foot pedal, and the seat member 14, e.g., the tray table. Activating the cable, e.g., adjusting the tension of the cable, by pressing the foot pedal causes the tray table itself to move from the stowed position to the deployed position, as best illustrated in FIGS. 6A-6B, without any additional manipulation of the tray table by the passenger. The foot pedal may be pressed a second time while the tray table is in the deployed position, as best illustrated in FIG. 6C, to adjust the tension of the cable again causing the tray table to move from the deployed position to the stowed position without any additional manipulation of the tray table itself by the passenger, as best illustrated in FIG. 6D.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. A passenger seat (which may incorporate features of any of the subsequent examples) comprising: a seat member moveable between a stowed position and a deployed position; and at least one actuator coupled to at least one portion of the seat member, wherein the at least one actuator is activable without direct contact with a passenger's hand to change a lock state of the seat member, and wherein an unlocked state of the seat member permits movement of the seat member between the stowed position and the deployed position.

Example 2. The passenger seat of Example 1 or any of the preceding or subsequent examples, wherein the seat member comprises at least one of a tray table, a seat back, or a personal electronic device holder.

Example 3. The passenger seat of Example 1 or any of the preceding or subsequent examples, wherein the passenger seat further comprises a pedal coupled to the at least one actuator, wherein the pedal is pressable without direct contact with the passenger's hand to activate the at least one actuator to change the lock state of the seat member.

Example 4. The passenger seat of Example 3 or any of the preceding or subsequent examples, wherein the at least one actuator comprises at least one cable coupled between the pedal and the at least one portion of the seat member.

Example 5. The passenger seat of Example 3 or any of the preceding or subsequent examples, wherein a movement of the pedal controls a movement of the seat member.

Example 6. The passenger seat of Example 1 or any of the preceding or subsequent examples, wherein the at least one portion of the seat member comprises a lock that maintains the stowed position of the seat member in a locked state.

Example 7. The passenger seat of Example 6 or any of the preceding or subsequent examples, wherein the lock is coupled to the at least one actuator, is engaged with the seat member in the locked state, and is disengaged from the seat member in the unlocked state.

Example 8. A hands-free release system (which may incorporate features of any of the preceding or subsequent examples) comprising: at least one actuator coupled to at least one portion of a seat member of a passenger seat; and a mechanism coupled to the at least one actuator, wherein the mechanism is engageable without direct contact with a passenger's hand to change a lock state of the seat member, and wherein an unlocked state of the seat member permits movement of the seat member between a stowed position and a deployed position.

Example 9. The hands-free release system of Example 8 or any of the preceding or subsequent examples, wherein the seat member comprises at least one of a tray table, a seat back, or a personal electronic device holder.

Example 10. The hands-free release system of Example 8 or any of the preceding or subsequent examples, wherein the mechanism comprises a pedal that is pressable without direct contact with the passenger's hand.

Example 11. The hands-free release system of Example 10 or any of the preceding or subsequent examples, wherein a movement of the pedal controls a movement of the seat member.

Example 12. The hands-free release system of Example 8 or any of the preceding or subsequent examples, wherein the at least one actuator comprises at least one cable coupled between the mechanism and the at least one portion of the seat member.

Example 13. The hands-free release system of Example 8 or any of the preceding or subsequent examples, wherein the at least one portion of the seat member comprises a lock that maintains the stowed position of the seat member in a locked state.

Example 14. The hands-free release system of Example 13 or any of the preceding or subsequent examples, wherein the lock is coupled to the at least one actuator, is engaged with the seat member in the locked state, and is disengaged from the seat member in the unlocked state.

Example 15. A method (which may incorporate features of any of the preceding or subsequent examples) comprising: engaging a mechanism of a passenger seat without direct contact with a passenger's hand to change a lock state of a seat member of the passenger seat; wherein the passenger seat comprises at least one actuator coupled to at least one portion of the seat member and the mechanism; wherein the mechanism is coupled to the at least one actuator; and wherein an unlocked state of the seat member permits movement of the seat member between a stowed position and a deployed position.

Example 16. The method of Example 15 or any of the preceding or subsequent examples, wherein the seat member comprises at least one of a tray table, a seat back, or a personal electronic device holder.

Example 17. The method of Example 15 or any of the preceding or subsequent examples, wherein the at least one portion of the seat member comprises a lock that maintains the stowed position of the seat member in a locked state.

Example 18. The method of Example 17 or any of the preceding or subsequent examples, wherein engaging the mechanism activates the at least one actuator and causes the lock to disengage from the seat member.

Example 19. The method of Example 15 or any of the preceding or subsequent examples, further comprising moving the mechanism to control a movement of the seat member.

Example 20. The method of Example 15 or any of the preceding examples, further comprising engaging the mechanism a second time to activate the at least one actuator and cause the seat member to move from the deployed position to the stowed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
    a tray table moveable between a stowed position and a deployed position; and
    a hands-free release system comprising at least one actuator coupled to at least one portion of the tray table, wherein the at least one actuator is activable without direct contact with a passenger's hand to change a lock state of the tray table;
    a pedal coupled to the at least one actuator, the pedal being pressable without direct contact with the passenger's hand to activate the at least one actuator to change the lock state of the tray table and being positioned entirely underneath a seat bottom of the passenger seat; and
    a lock that maintains the stowed position of the tray table in a locked state, wherein the lock is coupled to the at least one actuator, is engaged with the tray table in the locked state, is disengaged from the tray table in an unlocked state, and is rotatable to disengage from the tray table in the unlocked state via activation of the at least one actuator; and
    wherein the unlocked state of the tray table permits movement of the tray table between the stowed position and the deployed position.

2. The passenger seat of claim 1, wherein the actuator extends at least partially through an interior portion of the passenger seat.

3. The passenger seat of claim 1, wherein the actuator extends at least partially through an interior portion of a seat back of the passenger seat.

4. The passenger seat of claim 1, wherein the at least one actuator comprises at least one cable coupled between the pedal and the at least one portion of the tray table.

5. The passenger seat of claim 1, wherein a movement of the pedal controls a movement of the tray table.

6. The passenger seat of claim 1, wherein the pedal is communicatively coupled to the at least one actuator.

7. The passenger seat of claim 1, wherein the actuator extends at least partially through an interior portion of a seat frame of the passenger seat.

8. A hands-free release system comprising:
- at least one actuator coupled to at least one portion of a tray table of a passenger seat; and
- a mechanism coupled to the at least one actuator,
- wherein the mechanism is engageable without direct contact with a passenger's hand to activate the at least one actuator and change a lock state of the tray table;
- a lock that maintains a stowed position of the tray table in a locked state, wherein the lock is coupled to the at least one actuator, is engaged with the tray table in the locked state, is disengaged from the tray table in an unlocked state, and is rotatable to disengage from the tray table in the unlocked state via activation of the at least one actuator; and
- wherein the unlocked state of the tray table permits movement of the tray table between the stowed position and a deployed position.

9. The hands-free release system of claim 8, wherein the mechanism comprises a pedal that is pressable without direct contact with the passenger's hand.

10. The hands-free release system of claim 9, wherein the pedal is positioned entirely underneath a seat bottom of the passenger seat.

11. The hands-free release system of claim 9, wherein a movement of the pedal controls a movement of the tray table.

12. The hands-free release system of claim 8, wherein the at least one actuator comprises at least one cable coupled between the mechanism and the at least one portion of the tray table.

13. The hands-free release system of claim 8, wherein the mechanism is communicatively coupled to the at least one actuator.

14. The hands-free release system of claim 8, wherein the actuator extends at least partially through at least one of an interior portion of a seat frame of the passenger seat, an interior portion of a seat back of the passenger seat, or an interior portion of the passenger seat.

15. A method comprising:
- engaging a mechanism of a passenger seat without direct contact with a passenger's hand to change a lock state of a tray table of the passenger seat;
- wherein the passenger seat comprises at least one actuator coupled to at least one portion of the tray table and the mechanism;
- wherein the mechanism is coupled to the at least one actuator;
- wherein a lock maintains a stowed position of the tray table in a locked state, the lock is coupled to the at least one actuator, the lock is engaged with the tray table in the locked state, the lock is disengaged from the tray table in an unlocked state, and the lock is rotatable to disengage from the tray table in the unlocked state via activation of the at least one actuator; and
- wherein the unlocked state of the tray table permits movement of the tray table between the stowed position and a deployed position.

16. The method of claim 15, wherein the mechanism comprises a pedal that is pressable without direct contact with the passenger's hand, the pedal being positioned entirely underneath a seat bottom of the passenger seat.

17. The method of claim 15, wherein the mechanism is communicatively coupled to the at least one actuator.

18. The method of claim 15, wherein the actuator extends at least partially through at least one of an interior portion of a seat frame of the passenger seat, an interior portion of a seat back of the passenger seat, or an interior portion of the passenger seat.

19. The method of claim 15, further comprising moving the mechanism to control a movement of the tray table.

20. The method of claim 15, further comprising engaging the mechanism a second time to activate the at least one actuator and cause the tray table to move from the deployed position to the stowed position.

\* \* \* \* \*